United States Patent
Tanaka et al.

(10) Patent No.: US 7,042,711 B2
(45) Date of Patent: *May 9, 2006

(54) MULTI-FUNCTIONAL ELECTRONIC DEVICE WITH A CONTINUOUSLY ACCESSIBLE POINTING DEVICE

(75) Inventors: Toshiyuki Tanaka, Laguna Niguel, CA (US); Hiroyuki Kusaka, Toyko (JP); Aage Granaas, Redwood City, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 10/717,332

(22) Filed: Nov. 18, 2003

(65) Prior Publication Data

US 2005/0104847 A1    May 19, 2005

(51) Int. Cl.
*H05K 5/00* (2006.01)

(52) U.S. Cl. .................... 361/679; 361/681

(58) Field of Classification Search ........ 361/679–681, 361/683
See application file for complete search history.

(56) References Cited

U.S. PATENT DOCUMENTS

| | | | |
|---|---|---|---|
| 5,168,423 A | 12/1992 | Ohgami et al. | |
| 5,229,921 A | 7/1993 | Bohmer | |
| 5,268,817 A | 12/1993 | Miyagawa et al. | |
| 5,489,924 A | 2/1996 | Shima et al. | |
| 5,548,478 A | 8/1996 | Kumar et al. | |
| 5,644,469 A | 7/1997 | Shioya et al. | |
| 5,940,153 A * | 8/1999 | Castaneda et al. | 349/58 |
| 5,949,408 A | 9/1999 | Kang et al. | |
| 6,005,767 A | 12/1999 | Ku et al. | |
| 6,094,341 A | 7/2000 | Lin | |
| 6,125,040 A | 9/2000 | Nobuchi et al. | |
| 6,196,850 B1 | 3/2001 | Dietz et al. | |
| 6,231,371 B1 | 5/2001 | Helot | |
| 6,282,082 B1 | 8/2001 | Armitage et al. | |
| 6,396,687 B1 | 5/2002 | Sun et al. | |
| 6,430,038 B1 | 8/2002 | Helot et al. | |
| 6,437,973 B1 | 8/2002 | Helot et al. | |
| 6,464,195 B1 | 10/2002 | Hildebrandt | |
| 6,477,871 B1 | 11/2002 | Shaw et al. | |
| 6,483,445 B1 | 11/2002 | England | |
| 6,504,707 B1 | 1/2003 | Agata et al. | |
| 6,519,143 B1 | 2/2003 | Goko | |
| 6,519,148 B1 | 2/2003 | Nakagawa et al. | |
| 6,636,204 B1 * | 10/2003 | Santoh | 345/179 |
| 6,654,234 B1 | 11/2003 | Landry et al. | |
| 6,707,665 B1 | 3/2004 | Hsu et al. | |
| 6,717,798 B1 | 4/2004 | Bell et al. | |
| 6,774,870 B1 | 8/2004 | Mead, Jr. et al. | |
| 6,816,365 B1 | 11/2004 | Hill et al. | |
| 6,829,140 B1 | 12/2004 | Shimano et al. | |

(Continued)

FOREIGN PATENT DOCUMENTS

JP    07-049725    2/1995

(Continued)

*Primary Examiner*—Yean-Hsi Chang
(74) *Attorney, Agent, or Firm*—Blakely Sokoloff Taylor & Zafman, LLP

(57) ABSTRACT

According to one embodiment of the invention, an electronic device comprises a body case, a display and a pointing device. Featuring a flat panel display, the display is rotationally coupled to the body case and adapted to be translated over the body case. The pointing device is positioned at an edge of a first body of the body case. The pointing device is accessible and remains uncovered by the display for all positions of the electronic device and display.

16 Claims, 8 Drawing Sheets

U.S. PATENT DOCUMENTS

| | | |
|---|---|---|
| 6,842,338 B1 | 1/2005 | Iredale |
| 6,856,506 B1 | 2/2005 | Doherty et al. |
| 6,873,521 B1 | 3/2005 | Landry et al. |
| 2003/0112590 A1 | 6/2003 | Shimano et al. |
| 2003/0142474 A1 | 7/2003 | Karidis et al. |
| 2003/0203747 A1* | 10/2003 | Nagamine |
| 2003/0223190 A1 | 12/2003 | Hashimoto |
| 2004/0057197 A1 | 3/2004 | Hill |
| 2005/0052833 A1 | 3/2005 | Tanaka et al. |
| 2005/0105263 A1 | 5/2005 | Tanaka |

FOREIGN PATENT DOCUMENTS

| | | |
|---|---|---|
| JP | 10-055227 | 2/1998 |
| JP | 2000-228128 | 8/2000 |
| JP | 2002-222026 | 8/2002 |
| JP | 2003-044169 | 2/2003 |

* cited by examiner

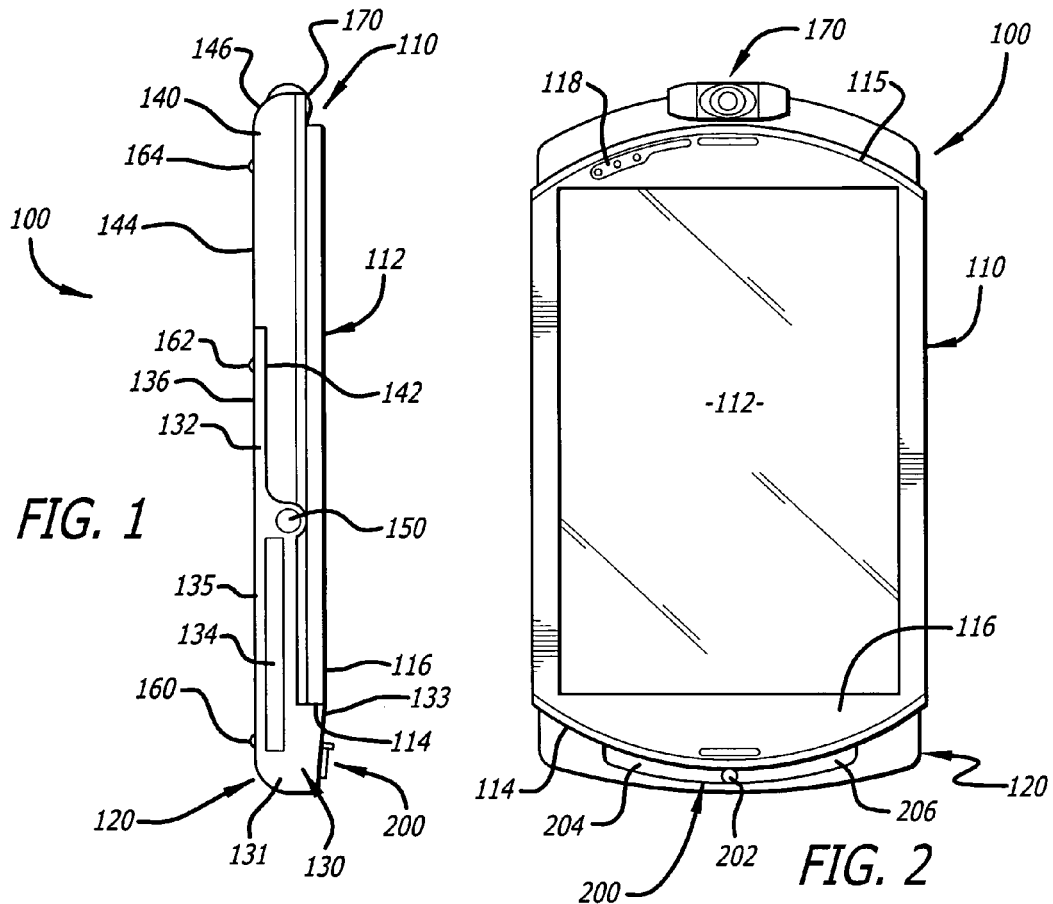
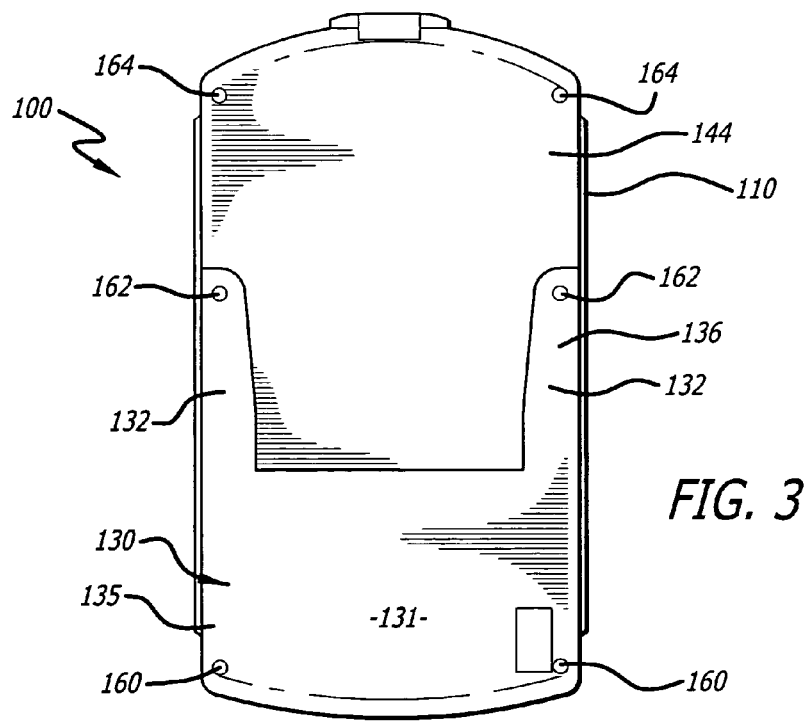

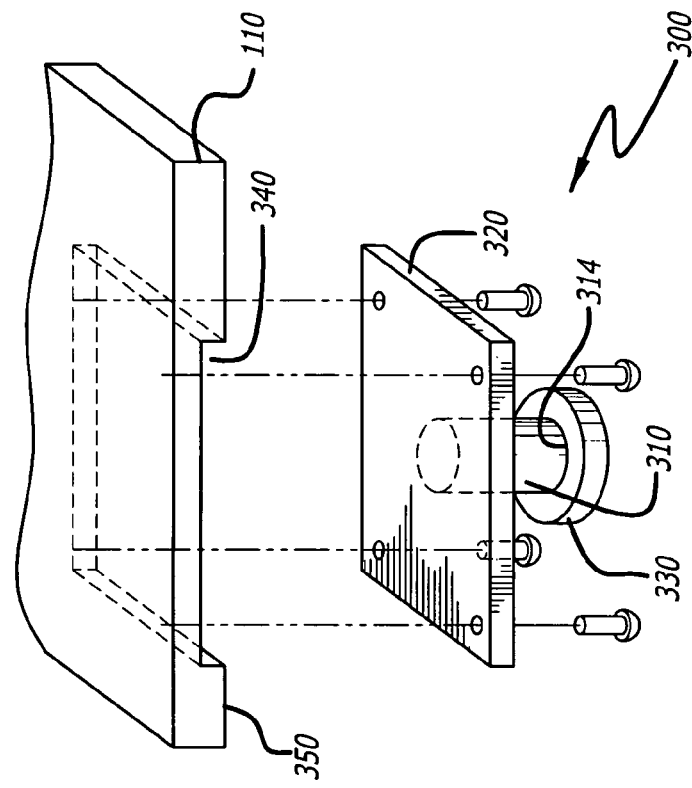
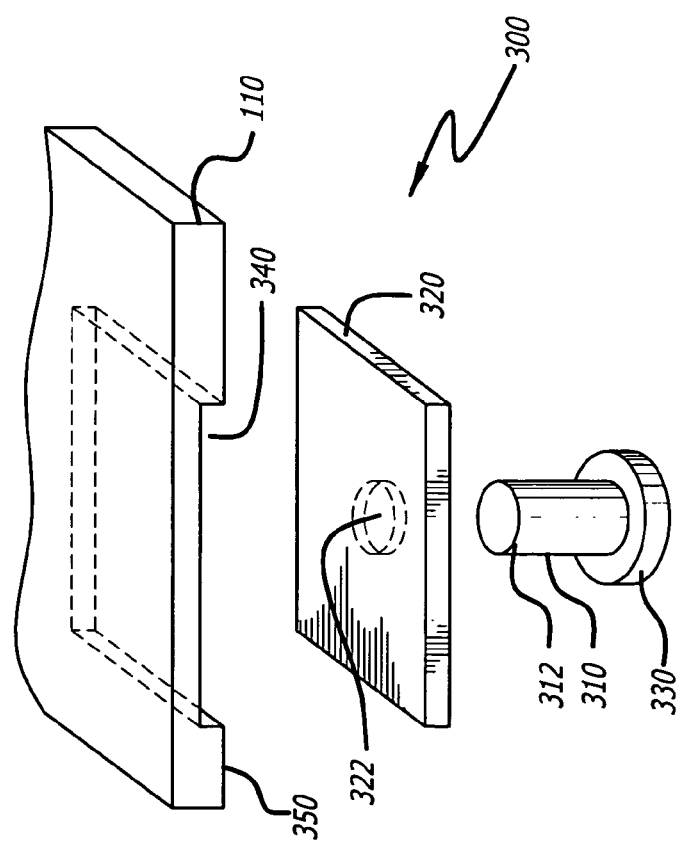
FIG. 6B
FIG. 6A

MULTI-FUNCTIONAL ELECTRONIC DEVICE WITH A CONTINUOUSLY ACCESSIBLE POINTING DEVICE

FIELD

Embodiments of the invention generally relate to the field of electronics. More specifically, embodiments of this invention relate to a multi-functional electronic device that comprises a pointing device that is always accessible to the user, regardless of the position of the display relative to the body case of the electronic device.

GENERAL BACKGROUND

Over the past few years, there has been increased demand for portable computers, especially in light of their enhanced data processing functionality. Operating from either external or portable power sources, conventional portable computers feature a liquid crystal display (LCD) connected to and mounted on a body case with an integrated keyboard.

According to one type of conventional portable computer, the LCD is rotationally attached to the body case along a vertical axis of rotation. As a result, the computer can generally operate either as a tablet computer when the LCD is positioned directly above the body case or as a laptop computer when the LCD is rotated and offset from the body case.

As shown, this conventional portable computer fails to provide any pointing device that enables omni-directional movement of a pointer. Even if a pointing device were ever deployed into the portable computer with this architecture, it would be completely hidden when the portable computer is used as a tablet computer. Rather, in order to use the pointing device, the portable computer would need to be situated as a laptop computer with the keyboard uncovered as well.

According to another type of conventional portable computer, the LCD is attached to the body case by mechanical guides. These guides are positioned on opposite sides of the body case and are in contact with the edges of the LCD. When laterally moved along these guides, the LCD remains generally in parallel with the body case. Alternatively, a topside of the LCD may be raised as the bottom side of the LCD is moved within the mechanical guides.

Similarly, this conventional portable computer features maneuver buttons that provide limited input for scrolling through data. These maneuver buttons appear to refresh the displayed page and do not constitute a pointing device adapted for omni-directional, continuous movement of the pointer.

BRIEF DESCRIPTION OF THE DRAWINGS

Features and advantages of embodiments of the invention will become apparent from the following detailed description in which:

FIG. 1 is a side view of an exemplary embodiment of an electronic device placed in a TABLET position.

FIG. 2 is an overhead perspective view of an exemplary embodiment of the electronic device of FIG. 1 placed in the TABLET position.

FIG. 3 is a bottom side perspective view of an exemplary embodiment of the electronic device of FIG. 1 placed in the TABLET position.

FIGS. 6A–6B are exploded views of exemplary embodiments of the coupling member adapted to be interposed between the display and body case of the electronic device.

DETAILED DESCRIPTION

Figure 4:
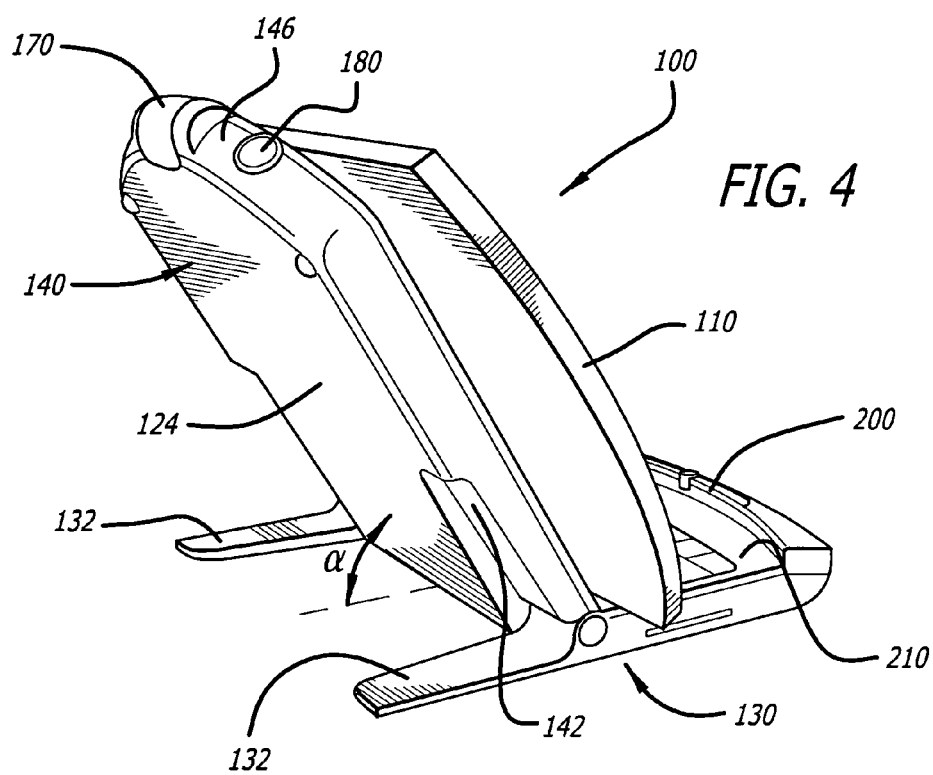
FIGS. 4 and 5 are first perspective views of an exemplary embodiment of the electronic device of FIG. 1 placed in the FREE-STANDING position.

Embodiments of the invention set forth in the following detailed description generally relate to an electronic device with a pointing device being accessible to the user regardless of the position of the display relative to the body case of the electronic device. The electronic device further comprises a camera for capturing one or more digital images and one or more hot keys to perform certain tasks without reliance on menu-driven selection by the pointing device.

In addition, operating in cooperation with sensors, a software application may be loaded within the electronic device in order to detect rotation (or lack thereof) of the display housing. Such detection may be used to control what input devices are permitted to provide input data when the electronic device is placed in a certain position.

In the following description, certain terminology is used to describe various features of one or more embodiments of the invention. For instance, an "electronic device" is defined as an electronic product with a flat panel display that can be rotated and translated. In this detailed description, for clarity sake, the electronic device is illustrated as a hand-held tablet computer that can be converted to a free-standing, portable computer. However, it is evident that the invention may be utilized in other types of electronic devices including, but not limited or restricted to personal digital assistants, cellular telephones, digital cameras, video cameras, navigation systems, and the like.

Herein, the term "rotate" as well as varying tenses thereof is generally defined as the angular movement about an axis of rotation. The axis of rotation may be relatively fixed to the overall orientation of the electronic device. For this detailed description, when used to denote a direction of rotation, the term "vertically rotate" (or any tense thereof) relates to rotation about a generally horizontal axis of rotation. Similarly, the term "horizontally rotate" (or any tense thereof) relates to rotation about a generally vertical axis of rotation. The terms "translate", "translation" or any tense thereof are defined as linear movement.

The term "interconnect" is any medium that is capable of transferring electrical signals from one point to another. Examples of an interconnect may include one or more electrical wires, any type of cable (e.g., flexible printed cable), optical fiber, or the like. A "display interconnect" is simply an interconnect coupled at one end to a display such as a flat panel display.

I. General Architecture

Referring to FIG. 1, a side view of an exemplary embodiment of an electronic device 100 placed in a TABLET position is shown. Herein, the electronic device 100 comprises a display 110 rotationally mounted on a body case 120 through a coupling member (not shown). Herein, the electronic device 100 operates as a tablet computer with the display 110 placed in a first (portrait) position.

More specifically, the display 110 contains a flat panel display 112 as well as all or part of the circuitry for generating a displayable image on the flat panel display 112. Examples of a flat panel display 112 include, but are not limited or restricted to a liquid crystal display (LCD), a plasma display or the like.

In accordance with this embodiment, the body case 120 comprises a first body 130 and a second body 140 rotationally coupled together by a hinge 150. The hinge 150 may be adapted as one or more friction hinges such as a brake hinge for example. This allows the second body 140 to be vertically rotated and maintained in any selected angle of rotation ($\alpha$, where $0 \leq \alpha \leq 135$). It is contemplated, however, that the hinge 150 need not include brake hinges when there is no need for maintaining the second body 140 at an angled orientation.

The first body 130 comprises a base 131 and one or more protrusions 132 extending from the base 131. The base 131 is configured with a raised area 133, which is contoured to be complementary with a curvature of an edge 114 of the flat panel display 112 and generally flush with a top surface 116 of the display 110. The raised area 133 features a pointing device 200, which is accessible when the electronic device 100 is in the TABLET position.

For this embodiment of the invention, as shown in FIG. 2, the pointing device 200 comprises a pointer guide 202 and one or more select buttons (e.g., buttons 204 and 206). The pointer guide 202 enables a user to freely adjust the position of a pointer displayed on the flat panel display 112. The pointer guide 202 may be configured in a variety of arrangements such as a track ball, touch pad or even a tactile device as shown. The dual select buttons 204 and 206 mimic the "left-select" and "right-select" buttons of a desktop mouse.

Referring back to FIG. 1, the base 131 is also adapted with a memory interface 134. The memory interface 134 may be adapted as a bay or communication port to receive a portable memory device such as one or more of the following: a memory card (e.g., PCMCIA card), a digital versatile disc (DVD), a compact disc (CD), a digital tape, or a floppy disk.

The protrusions 132 extend under recessed portions 142 of the second body 140. For instance, according to one embodiment of the invention, the protrusions 132 approximately extend up to a latitudinal center of the second body 140.

A first grommet pair 160 is positioned on a bottom surface 135 of the base 131. Moreover, a second grommet pair 162 is positioned on a bottom surface 136 of the protrusions 132. These grommets 160 and 162 prevent sliding of the electronic device 100 when used on a table or other flat surface.

The second body 140 may be rotated about an axis of rotation established by the hinge 150 after the display 110 has been appropriately rotated and translated as shown below. A pair of grommets 164 is positioned on a bottom surface 144 of the second body 140.

Optionally, a camera 170 may be rotationally coupled along an end 146 of the second body 140. Such coupling may be accomplished by a friction hinge, which would maintain the camera 170 facing in a direction manually set by the user. Upon activation of the camera 170, the captured digital image is processed by circuitry within the body case 120 and stored in (i) volatile or non-volatile memory deployed within the body case 120, or (ii) the portable memory device adapted to memory interface 134 as described above.

Referring now to FIG. 2, an overhead view of the electronic device 100 placed in the TABLET position is shown. Herein, the flat panel display 112 of the display 110 is mounted on the body case 120 in a stacked arrangement where the electronic device 100 operates as a portable tablet. For this embodiment of the invention, the display 110 is configured in an oblong shape having a concave curvature at edge 114 and a convex curvature at edge 115. In this orientation, the display 110 covers at least one-half, and as shown, over seventy percent of a footprint of the body case 120, including a keyboard (not shown) integrated into the first body 130 but excluding the pointing device 200.

As shown in FIG. 2, one or more hot keys 118 are integrated near an edge 115 of the display 110. A "hot key" is a recessed area that, when activated such as by contact with a stylus, causes a task to be more quickly performed than by selecting entries from menus via the pointing device 200. These tasks can be specified and programmed at manufacture or can be programmed by the user. In general, exemplary tasks controlled by the hot keys 118 include starting an application, establishing network connectivity (e.g., electronic mail), commencing a power-down procedure, or the like.

Alternatively, it is contemplated that the hot keys 118 may be used to adjust "style parameters," namely indicia associated with line representations produced by a stylus or other writing instrument when the electronic device 100 is placed in the TABLET position. For instance, one or more of hot keys 118 may be used to adjust line color, line thickness, line pattern (e.g., solid, dashed, etc.). The hot keys 118 may also be used to provide special effects to the line (e.g., highlighting, color blending, or any other alteration of line color, thickness or pattern).

Figure 5:
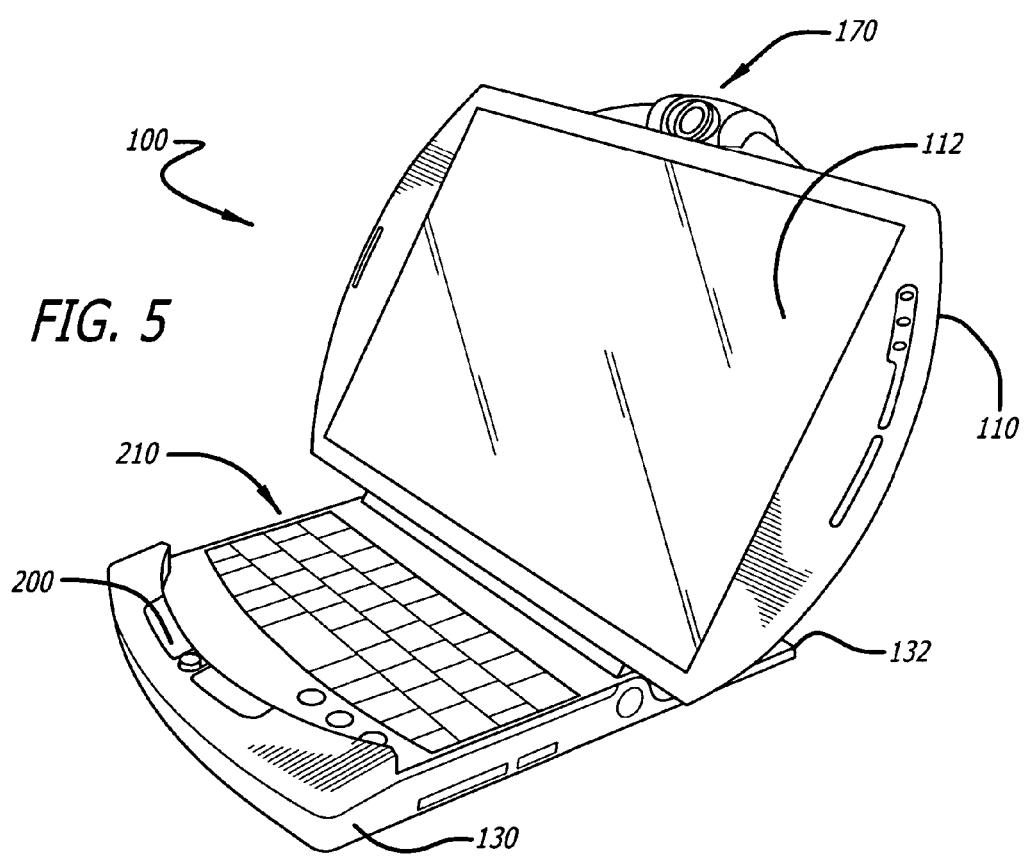

Referring to FIG. 3, a perspective view of the bottom sides 135, 136 and 144 of the electronic device 100 are shown. The first body 130 is configured with the protrusion 132 that are used to provide stability when the display 110 is rotated or translated as shown in FIGS. 4 and 5. The base 131 is sized to provide sufficient support for the display 110 when the electronic device 100 is placed in the FREE-STANDING position. The grommet pairs 160 and 162 are positioned on opposite sides of the first body 130 and spaced appropriately to reduce skid during use.

Referring now to FIGS. 4 and 5, perspective views of the electronic device 100 placed in a FREE-STANDING position is shown. Herein, the second body 140 is vertically rotated by the angle of rotation (a). Such rotation is performed after the display 110 has been horizontally rotated and translated toward the camera 170 as described below in detail. Hence, the pointing device 200 and the keyboard 210 are fully accessible by the user while the display 110 covers more than one-half and perhaps more than seventy percent of the footprint of the second body 140.

The second body 140 comprises recessed portions 142, which are sized to accommodate protrusions 132 of the first body 130. As a result, the collective bottom surfaces of the bodies 130 and 140 are substantially planar when the electronic device 100 is placed in the TABLET position as shown in FIG. 1. Moreover, the second body 140 features a holder 180 for a writing instrument. According to one embodiment, the holder 180 may be a cavity formed within the second body 140 and positioned at the end 146. It is contemplated, however, that the holder 180 may be configured and positioned at different locations on the electronic device 100.

Referring now to FIGS. 6A–6B, exploded views of exemplary embodiments of a coupling member 300 are shown. Of course, the coupling member 300 may be produced in a variety of physical configurations other than those illustrated. Regardless of its configuration, the coupling member 300 enables the display 110 to be rotated and translated over the body case 120.

For instance, in each of the embodiments illustrated in FIGS. 6A–6B, the coupling member 300 comprises a shaft 310 interconnecting a fastening element 320 and a securing element 330. Both the shaft 310 and elements 320 and 330 may be made of a rigid composition such as hardened plastic, metal, or the like. The shapes of the fastening and securing elements 320 and 330 are a design choice.

According to one embodiment of the invention, as shown in FIG. 6A, the shaft 310 and securing element 330 are formed together as the same element. The shaft 310 comprises a first end 312 adapted for coupling to the fastening element 320. For instance, the first end 312 may be sized and configured for insertion into a cavity 322 of the fastening element 320, and thereafter, retained by the fastening element 320.

As an example, the first end 312 may be a "snap-in" insert that is adapted to mate with a complementary female cavity 322 located on the fastening element 320. Alternatively, as another example, the first end 312 may be coupled to the fastening element 320 by another conventional coupling technique such as threads, welding, gluing, or the like.

According to another embodiment of the invention, as shown in FIG. 6B, the shaft 310 and fastening element 320 may be formed together as a single element. The shaft 310 comprises a second end 314 that is coupled to the securing element 330 by utilizing any coupling technique. Of course, it is contemplated that the shaft 310 and elements 320, 330 may be configured as a single molded element as well.

Herein, as further shown in both FIGS. 6A and 6B, the fastening element 320 is adapted for insertion into a socket 340 generally formed at the center of a bottom surface 350 of the display 110. The socket 340 is formed to securely retain the fastening element 320 inserted therein (FIG. 6A). Otherwise, additional fasteners (e.g., screws, rivets, etc.) may be used (FIG. 6B). Thus, the display 110 is rotated and translated in response to rotation and translation of the coupling member 300.

Of course, it is contemplated that the fastening element 320 may be integrated into the display 110 or pre-formed as part of the display 110. For these embodiments, the coupling member 300 would comprise the shaft 310 adapted to the fastening element 320 (or display 110) and the securing element 330.

Figure 7:
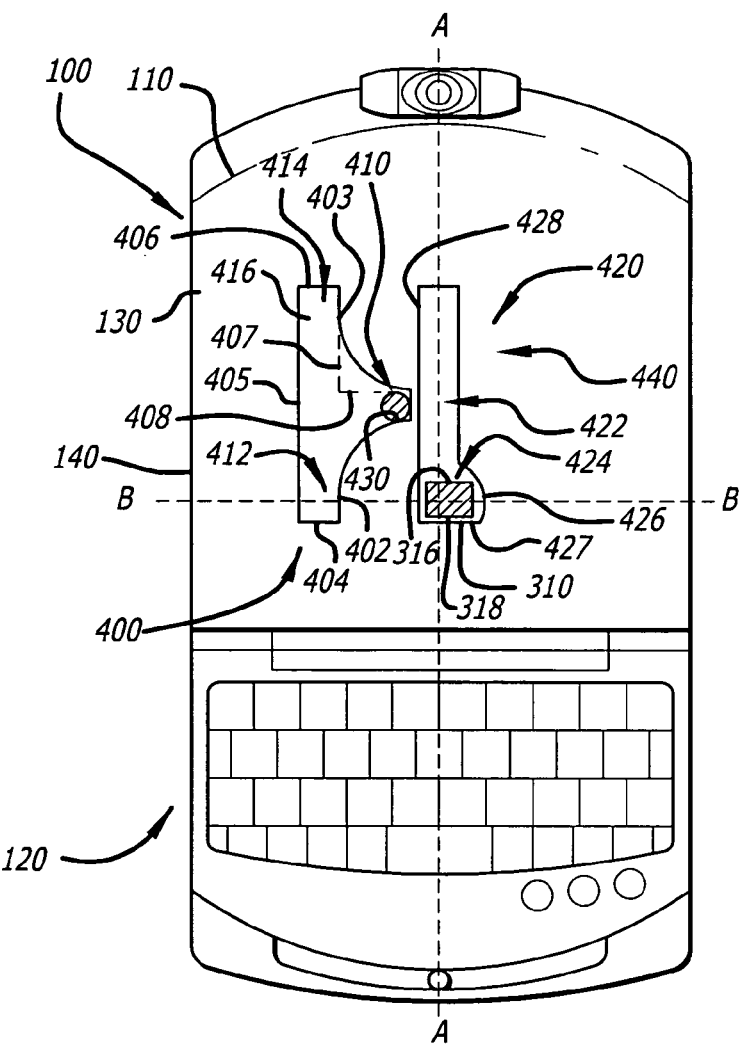
FIG. 7 is an overhead view of a first exemplary embodiment of the body case with the electronic device placed in the TABLET position.

Referring to FIG. 7, an overhead view of an exemplary embodiment of the electronic device 100 placed in the TABLET position is shown. Herein, the body case 120 comprises a first opening 400 and a second opening 420 forming an interconnect area 440. These openings 400 and 420 are situated within the second body 140 so that a substantial portion of the second opening 420 is approximately positioned at a longitudinal center of the body case 120.

For this embodiment of the invention, the first opening 400 is adapted as a conduit for a display interconnect 430, which is used to electrically couple the flat panel display with circuitry (e.g., digital-to-analog converter, processor, chipset, memory, etc.) housed within the body case 120. The first opening 400 includes a plurality of perimeter edges 402–406, which collectively form three interconnect retention areas 410, 412 and 414. A channel 416 is formed between retention areas 412 and 414.

As described herein, the display interconnect 430 resides in the retention area 410 when the electronic device is placed in the TABLET position. The display interconnect 430 resides in retention areas 412 and 414 when the display 110 is rotated and translated from a first position when the electronic device 100 operates as a tablet computer.

For this embodiment of the invention, the first perimeter edge 402 is configured with a convex curvature, shaped as an arc, to provide a continuous transition of the display interconnect 430 between retention areas 410 and 412. It is contemplated that the radius of the arc may be equal to the distance between the center of the body case 130 and the display interconnect 430. However, in other embodiments, the radius of the arc may be sized differently.

Herein, the second perimeter edge 403 is configured with an arc shaped curvature that is a mirror image of the first perimeter edge 402. However, it is contemplated that the second perimeter edge 403 may be substituted for generally straight perimeter edges 407 and 408 as represented by dashed lines.

The other perimeter edges 404–406 generally form the channel 416 over which the display interconnect 430 can be moved between the second retention area 412 and the third retention area 414 as described below.

Referring still to FIG. 7, the second opening 420 is shaped to limit the angle of rotation and translation of the shaft 310 of the coupling member 300. For this embodiment of the invention, the second opening 420 is keyhole-shaped with a linear channel portion 422 and an expanded portion 424 positioned adjacent to one end of the channel portion 422. In one embodiment of the invention, the expanded portion 424 is positioned at the center of the body case 120.

Defined by perimeter edges 426, 427 and a portion of perimeter edge 428, the expanded portion 424 is generally wider than the channel portion 422. This allow for rotation of the display 110 when the shaft 310 is rotated.

For this embodiment of the invention, the shaft 310 has a rectangular cross-sectional area having a length (L) exceeding the width of the channel portion 422 and a width (W) slightly less than the width of the channel portion 422. The positioning and shape of the shaft 310 are selected to restrict rotation and translation of the display 110 attached thereto. For instance, when the shaft 310 is situated in a "lengthwise" orientation as shown, translation of the coupling member 300 is precluded because a first side 316 of the shaft 310, perpendicular to a translation path, exceeds the width of the channel portion 422.

As further shown in FIG. 7, the cross-sectional shape of the shaft 310 along with the shape of the perimeter edge 426 enable counter-clockwise (CCW) rotation of the shaft 310 by approximately ninety degrees (90°). However, any rotation well beyond ninety degrees is precluded since the first side 316 of the shaft 310 would come into contact with the perimeter edge 428. Similarly, the cross-sectional shape of the shaft 310 discourages CW rotation of the display 110 when the electronic device 100 placed in the TABLET position.

Figure 8:
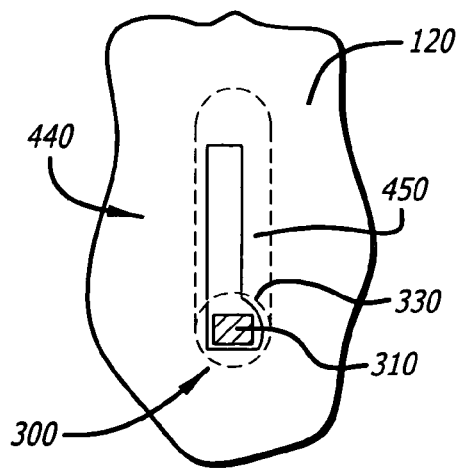
FIG. 8 is an exemplary embodiment of multiple layers of an interconnect area within the body case of the electronic device placed in the TABLET position.

Referring now to FIG. 8, an exemplary embodiment of multiple layers of the interconnect area 440 within the body case 120 is shown. The interconnect area 440 features a slot 450 configured within the second body 140. The slot 450 has a depth less than the length of the shaft 310 of the coupling member 300. As a result, the shaft 310 protrudes from the second opening 420 of the body case 120. The slot 450 is configured not only to retain the securing element 330 within the body case 120, but also to permit translation of the securing element 330.

Figure 9:
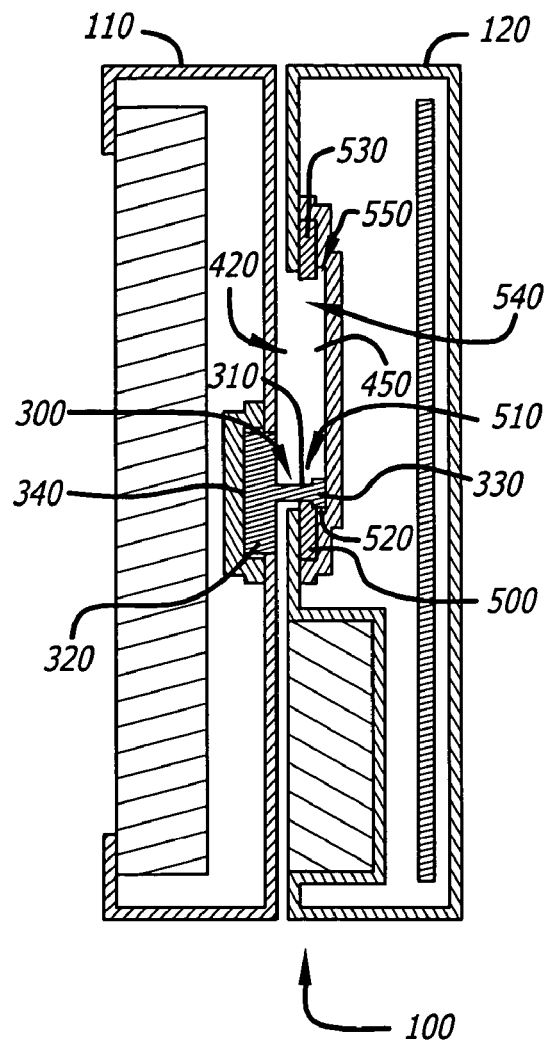
FIG. 9 is a cross-sectional view of the electronic device of FIG. 7 along a cross-sectional line A—A.

Referring now to FIG. 9, a cross-sectional view of the electronic device 100 of FIG. 7 along a cross-sectional line A—A is shown. Herein, the fastening element 320 of the coupling member 300 is inserted into the socket 340 and coupled to the display 110. Therefore, any rotation or translation of the coupling member 300 causes corresponding rotation or translation of the display 110.

As shown, the second opening 420 constitutes an opening for the slot 450 configured to enable rotation and translation of the coupling member 300. According to one embodiment of the invention, the slot 450 comprises a first retention element 500 situated at a first end 510 of the slot 410. The first retention element 500 provides a recess 520.

When the electronic device 100 is placed in the TABLET position, the securing element 330 is partially inserted into the recess 520. The recess 520 is sized so that the first retention element 500 applies downward forces against the securing element 330. As a result, the coupling member 300 is maintained in this position even during rotation of the display 110. The securing element 330 is disengaged from the recess 520 only when lateral forces are applied to translate the display 110.

As shown, the slot 450 further comprises a second retention element 530 situated at a second end 540 of the slot 450. The second retention element 530 is generally identical in construction to the first retention element 500 and provides a recess 550 sized to receive the securing element 330 of the coupling member 300.

Figure 10:
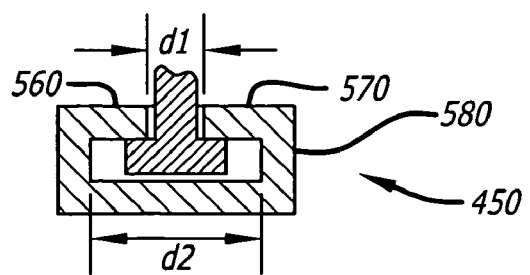
FIG. 10 is a cross-sectional view of a slot positioned within the second body of FIG. 7 along a cross-sectional line B—B.

As shown in FIG. 10, a cross-sectional view of the slot 450, positioned within the second body 140 of FIG. 9, along a cross-sectional line B—B is shown. Two flanges 560 and 570 may be attached to sidewalls 580 of the slot 450. These flanges 560 and 570 extend inward toward each other so that the distance (d1) between flanges 560 and 570 is wider than any side of the shaft 310, most notably a cross-sectional length of the shaft 310. The distance (d2) between sidewalls 580 of the slot 310 is of sufficient length to allow rotation of the securing element 330, but prevents unwanted lateral movement (i.e., rocking) of the coupling member 300.

II. Modes of Operation

FIGS. 11–16 illustrate exemplary embodiments of the electronic device 100 being transformed from use as a tablet PC to a portable computer. This is accomplished through rotation and translation of the display 110 as described below.

Figure 11:
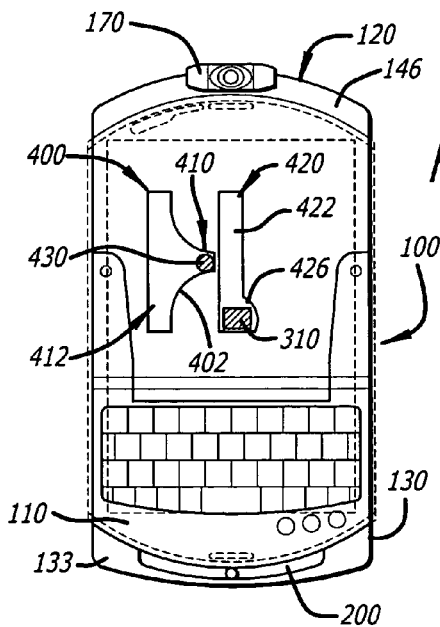
FIG. 11 is an exemplary embodiment of the electronic device 100 placed in a TABLET position for illustration of the operations for placement into a FREE-STANDING position.

Referring now to FIG. 11, an exemplary embodiment of the electronic device 100 placed in a TABLET position is shown. Herein, the display 110 is mounted on the body case 120 via the coupling member and covers almost the entire body case 120, excluding the pointing device 200 placed on the raised area 133 of the first body 130 and the camera 170 along the end 146 of the second body 140.

Herein, software is deployed within the electronic device 100 to detect when the electronic device 100 is in the TABLET position (i.e., the display 110 is placed in a portrait orientation). When this position is detected, the software allows input data from either a writing instrument on the flat panel display 112 or a camera 170. No input data from the keyboard is accepted. However, when the electronic device 100 is placed into the FREE-STANDING position (i.e., the display 110 is horizontally rotated and translated), the software allows input data from either the keyboard 210 or the camera 170. No stylus input is accepted. This further improves operability of the electronic device 100.

Figure 12:
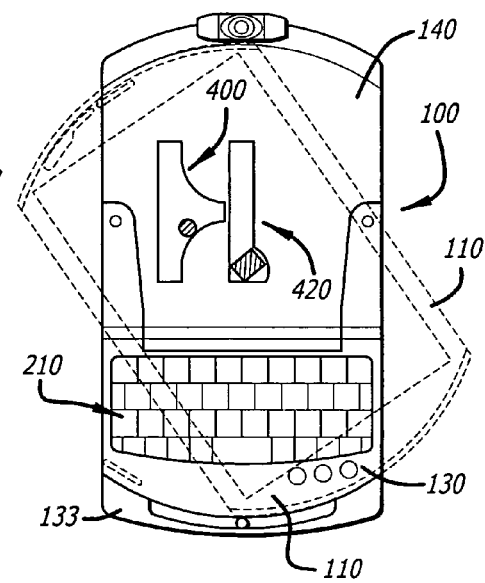
FIG. 12 is an exemplary embodiment of the electronic device being rotated for illustration of the operations for placement into a FREE-STANDING position.

As shown in FIG. 12, the display 110 is horizontally rotated. Herein, the keyboard 210, integrated into the first body 130, is partially exposed. In addition, more surface area of the second body 140 is exposed, while the first and second openings 400 and 420 still remain covered by the display 110.

Figure 13:
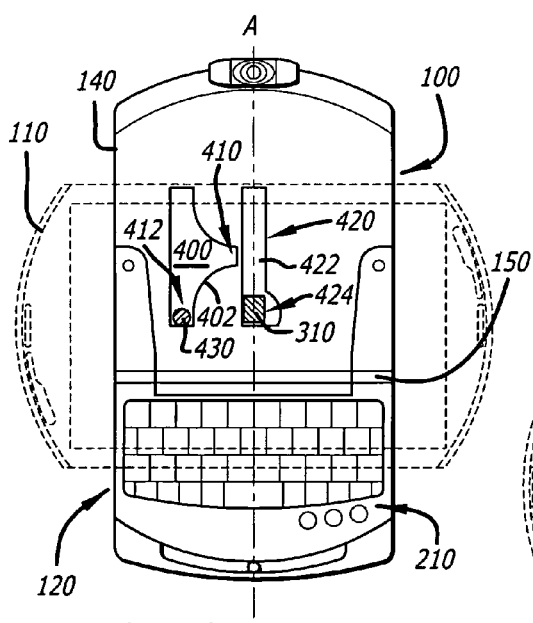
FIG. 13 is an exemplary embodiment of the electronic device being placed in the INTERMEDIARY position for illustration of the operations for placement into a FREE-STANDING position.

Referring now to FIG. 13, an overhead view of an exemplary embodiment of the electronic device 100 placed in an INTERMEDIARY position is shown. Herein, the display 110 is now substantially centered over the body case 120 and continues to cover the hinge 150, which precludes vertical rotation of the second body 140. However, a portion of the keyboard 210 is visible. In general, the display 110 covers approximately fifty percent of the footprint for each body of the body case 120.

After rotation of the display 110 by approximately ninety degrees (90°) in the CCW direction, the display interconnect 430 has moved along the first perimeter edge 402 of the first opening 400 from the first retention area 410 to the second retention area 412.

In addition, the coupling member has been rotated by ninety degrees (90°) in the CCW direction, but still remains in the expanded portion 424 of the second opening 420. In particular, the shaft 310 is rotated accordingly, and therefore, is now situated in a "width-wise" orientation where none of the sides of the shaft 310 that are perpendicular to the linear channel portion 422 exceed the width of the channel portion 422.

Figure 14:
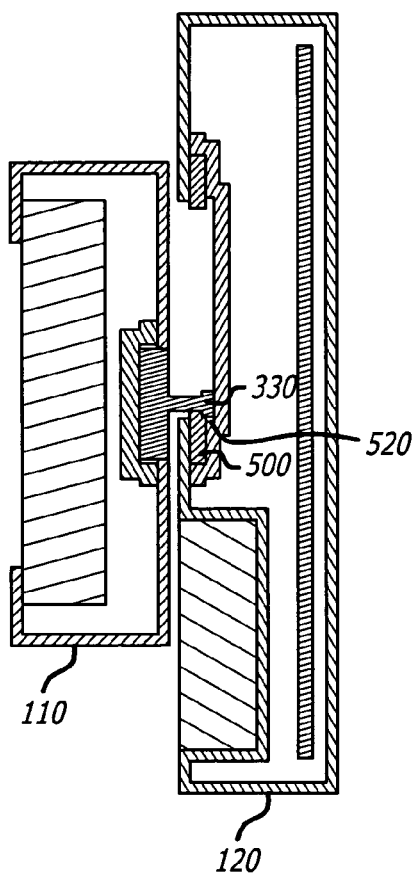
FIG. 14 is a cross-sectional view of the electronic device of FIG. 12 along a cross-sectional line A—A.

Referring to FIG. 14, a cross-sectional view of the electronic device of FIG. 13 along a cross-sectional line A—A is shown. Herein, the securing element 330 is rotated, but is still retained within the recess 520 formed by the retention element 500.

Figure 15:
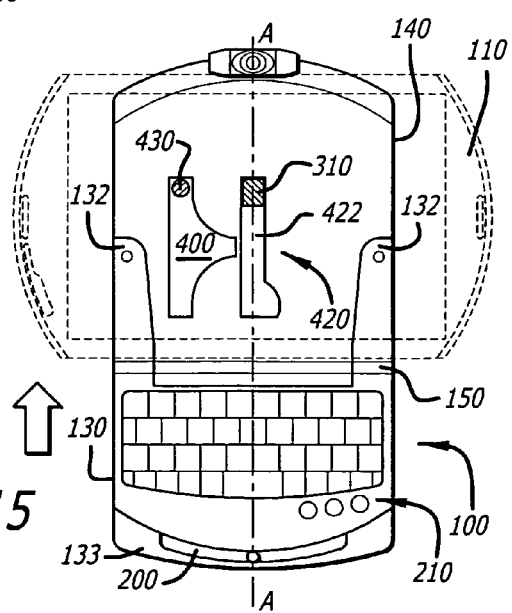
FIG. 15 is an exemplary embodiment of the electronic device being placed in the FREE-STANDING position for illustration of the operations performed on the electronic device.

Referring to FIG. 15, an exemplary embodiment of the electronic device 100 placed into the FREE-STANDING position is shown. In general, the display 110 is adjusted by moving the coupling member along the channel portion 422 of the second opening 420. As a result, the display 110 is positioned to clear the hinge 150 and exposes the entire first body 130, including the pointing device 200 and keyboard 210. This enables the second body 140, along with the display 110, to be vertically rotated in accordance with the hinge 150. During such rotation, the protrusions 132 of the first body 130 would operate as legs in balancing and maintaining angled positioning of the display 110.

Figure 16:
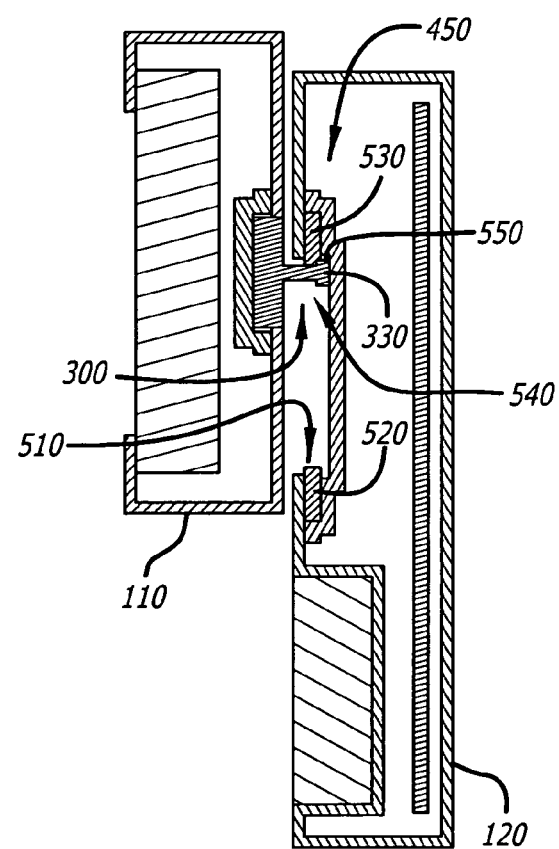
FIG. 16 is a cross-sectional view of the electronic device of FIG. 15 along a cross-sectional line A—A.

Referring now to FIG. 16, a cross-sectional view of the electronic device 100 of FIG. 15 along cross-sectional line A—A is shown. Herein, the securing element 330 of the coupling member 300 becomes disengaged from the recess 520. The coupling member 300 is moved from the first end 510 to the second end 540 of the slot 450. Thereafter, the securing element 330 is inserted into the second recess 550 formed by the second retention element 530.

III. Keypad Add-On

Figure 17:
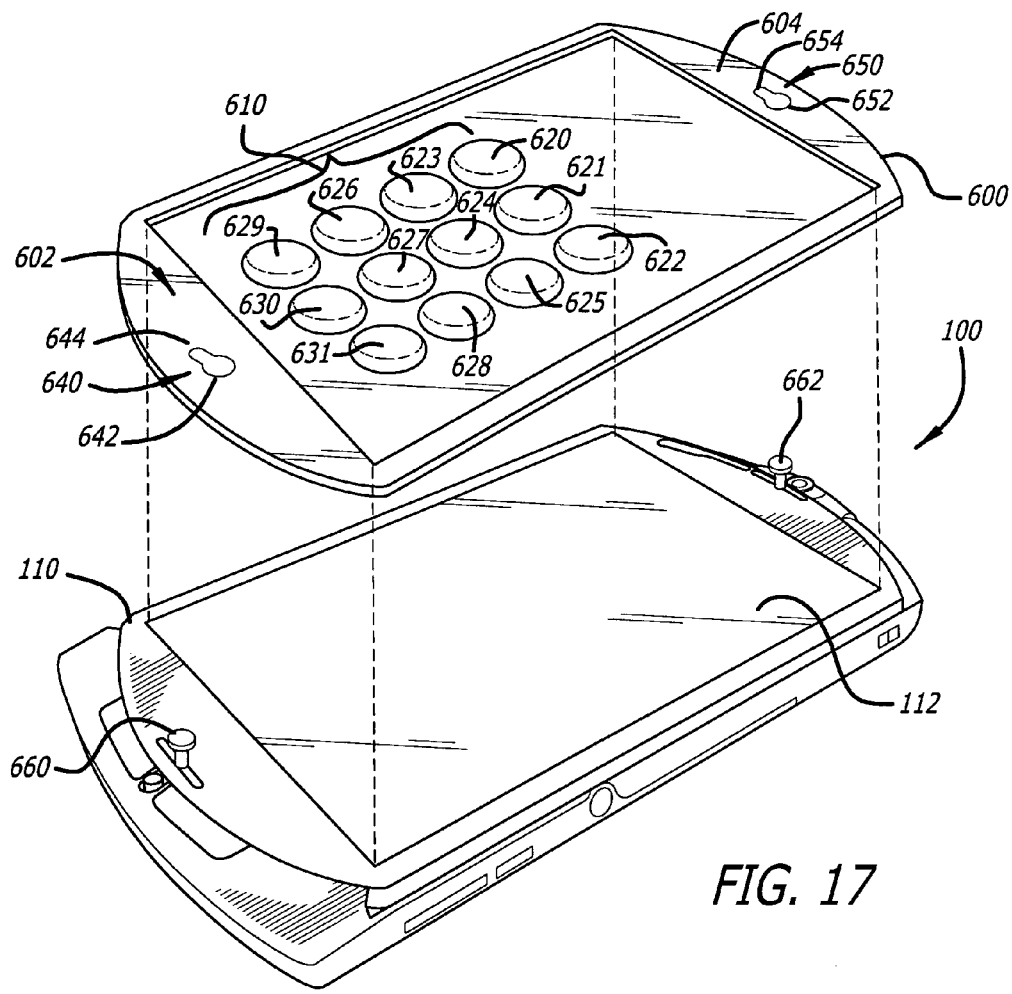
FIG. 17 is an exemplary embodiment of a cover being placed over the display of the electronic device for functionality as a keypad.

Referring to FIG. 17, an exemplary embodiment of a cover 600 being placed over some or all of the flat panel display 112 of the electronic device 100 is shown. In general, the cover 600 is made of a material that, when a force is exerted on the material, the electronic device 100 can detect what area on the flat panel display 112 that such force is exerted. For example, the cover 600 may be made of an acrylic resin.

For this embodiment of the invention, the cover 600 comprises a plurality of raised surfaces 610 positioned in a 4×3 matrix. Each of the raised surfaces 620–631 operates as a lens to magnify an image generated under the raised surface by the flat panel display 112. As an example, numbers 1–9 and "0" may be generated under raised surfaces 620–628 and 630 while symbols "*" and "#" may be generated under raised surfaces 629 and 631, respectively.

The cover 600 is securely coupled to the display 110 by a variety of locking mechanisms. As an example, the cover 600 may feature a locking aperture 640 at a first end 602 of the cover 600 and/or a locking aperture 650 at a second end 604 of the cover 600. The locking apertures 640 and 650 are sized with a first portion 642, 652 having a diameter greater than a second portion 644, 654. The locking apertures 640 and 650 are adapted to receive a fastener 660 and 662, respectively.

Figure 18:
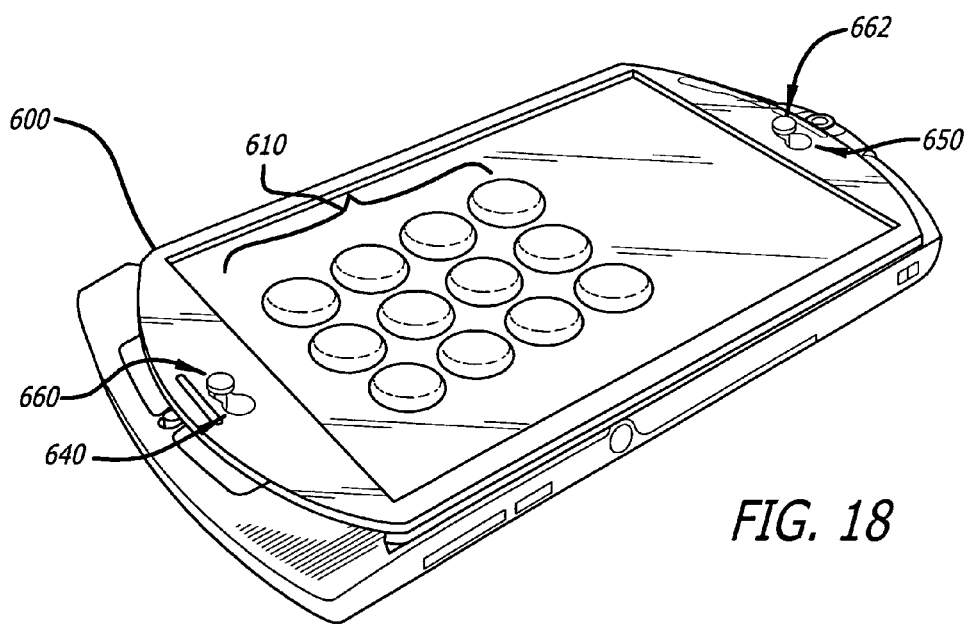
FIG. 18 is an exemplary embodiment of the display of the electronic device adapted with the cover shown in FIG. 17.

More specifically, the cover 600 is loosely attached to the display 110 when the fasteners 660 and 662 are both inserted through the first portions 642 and 652, respectively. However, when the cover 600 is laterally moved so that one or both of the fasteners 660 and 662 are now inserted through the second portions 644 and 654 respectively, the cover 600 is securely attached to the display 110 as shown in FIG. 18.

It is contemplated that the raised surfaces 610 may be configured in a number of orientations. For instance, the raised surfaces 610 may be configured to represent PLAY, STOP, FAST FORWARD, REWIND and EJECT buttons of a portable music device. Also, the raised surfaces 610 may be adapted with numeral buttons (0–9) and computation buttons ("+", "−", "/", "*", "="), replicating the functionality of a calculator.

While certain exemplary embodiments of the invention have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible.

What is claimed is:

1. An electronic device, comprising:
   a body case includes a first body and a second body, and the pointing device is integrated in the first body;
   a hinge rotationally coupled to the first body and the second body;
   a keyboard positioned at the first body;
   a display mounted on the body case for horizontal rotation and translation over the body case, the display substantially covering a footprint of the body case;
   a coupling member coupled to the second body and the display, the coupling member being adapted to horizontally rotate and translate the display, the display is horizontally rotated by the coupling member between a first position where the display covers the keyboard and a second position where the display exposes at least part of the keyboard; and
   a pointing device integrated in the first body of the body case, the pointing device being accessible regardless of the rotation and the translation of the display.

2. The electronic device according to claim 1, wherein the coupling member is a shaft coupled between a fastening element coupled to the display and a securing element slidably coupled to the second body.

3. The electronic device according to claim 1, wherein the display is horizontally translated by the coupling member between the second position and a third position in order to entirely expose the keyboard.

4. The electronic device according to claim 3, wherein the second body is prevented from rotation when the display is in the first position and the second position, and is released for rotation when the display is in the third position.

5. The electronic device according to claim 1, wherein the pointing device comprises (i) a pointer guide to control a position of a pointer displayed on the display, and (ii) at least one button positioned adjacent to the pointer guide.

6. The electronic device according to claim 5 further comprising a cover adapted to be coupled to the display, the cover includes a plurality of raised surfaces each operating as a lens to magnify an image displayed by a flat panel display of the display at a location on the flat panel display under the raised surface.

7. The electronic device according to claim 1 further comprising a camera positioned on the second body.

8. The electronic device according to claim 1 further comprising a holder for a writing instrument arranged on the second body.

9. An electronic device, comprising:
   a body case including a first body and a second body;
   a hinge coupling the first body and the second body, the hinge configured to enable the second body to be vertically rotated from the first body;
   a display rotationally coupled to the body case and adapted to be rotated and translated over the body case, the display having a flat panel display;
   a coupling member coupled to the second body and the display, the coupling member being adapted to horizontally rotate and translate the display;
   a keyboard associated with the first body, the keyboard being covered by the display when the electronic device is placed in a first position and being partially covered by the display when the electronic device is placed in a second position; and
   a pointing device integrated in the first body, the pointing device being accessible and remaining uncovered by the display for all positions of the display.

10. The electronic device according to claim 9, wherein the display is horizontally translated by the coupling member in order to entirely expose the keyboard when the electronic device is moved from the second position and a third position.

11. The electronic device according to claim 10, wherein the second body is prevented from rotation by the hinge when the display is in the first position and the second position, and is released for rotation by the hinge when the display is in the third position.

12. The electronic device according to claim 9, wherein the pointing device comprises (i) a pointer guide to control a position of a pointer displayed on the display, and (ii) at least one button positioned adjacent to the pointer guide.

13. The electronic device according to claim 9 further comprising a camera positioned on the second body.

14. The electronic device according to claim 9 further comprising a holder for a writing instrument arranged on the second body.

15. The electronic device according to claim 9 further comprising a cover adapted to be coupled to the display, the cover includes a plurality of raised surfaces each operating as a lens to magnify an image displayed by the flat panel display at a location on the flat panel display under the raised surface.

16. An electronic device, comprising:
a body case comprises a first body and a second body;
a hinge coupled to the first body and the second body;
a display mounted over the body case, the display to cover (i) over seventy percent of a footprint of the first body and over seventy percent of a footprint of the second body when the electronic device is placed in a TABLET position, and (ii) none of the first body and at least one-half of the footprint of the second body when the electronic device is placed in a FREE-STANDING position;
a camera positioned along an edge of the second body and remaining uncovered by the display for all positions of the display including the TABLET position and in the FREE-STANDING position; and
a pointing device positioned at an edge of the first body, the pointing device being accessible and remaining uncovered by the display for all positions of the display including when the electronic device is in the TABLET position and in the FREE-STANDING position.

* * * * *